April 12, 1960 H. HOPFELD 2,932,358
LADDER CONSTRUCTION AND THE METHOD FOR MAKING THE SAME
Filed Dec. 4, 1956
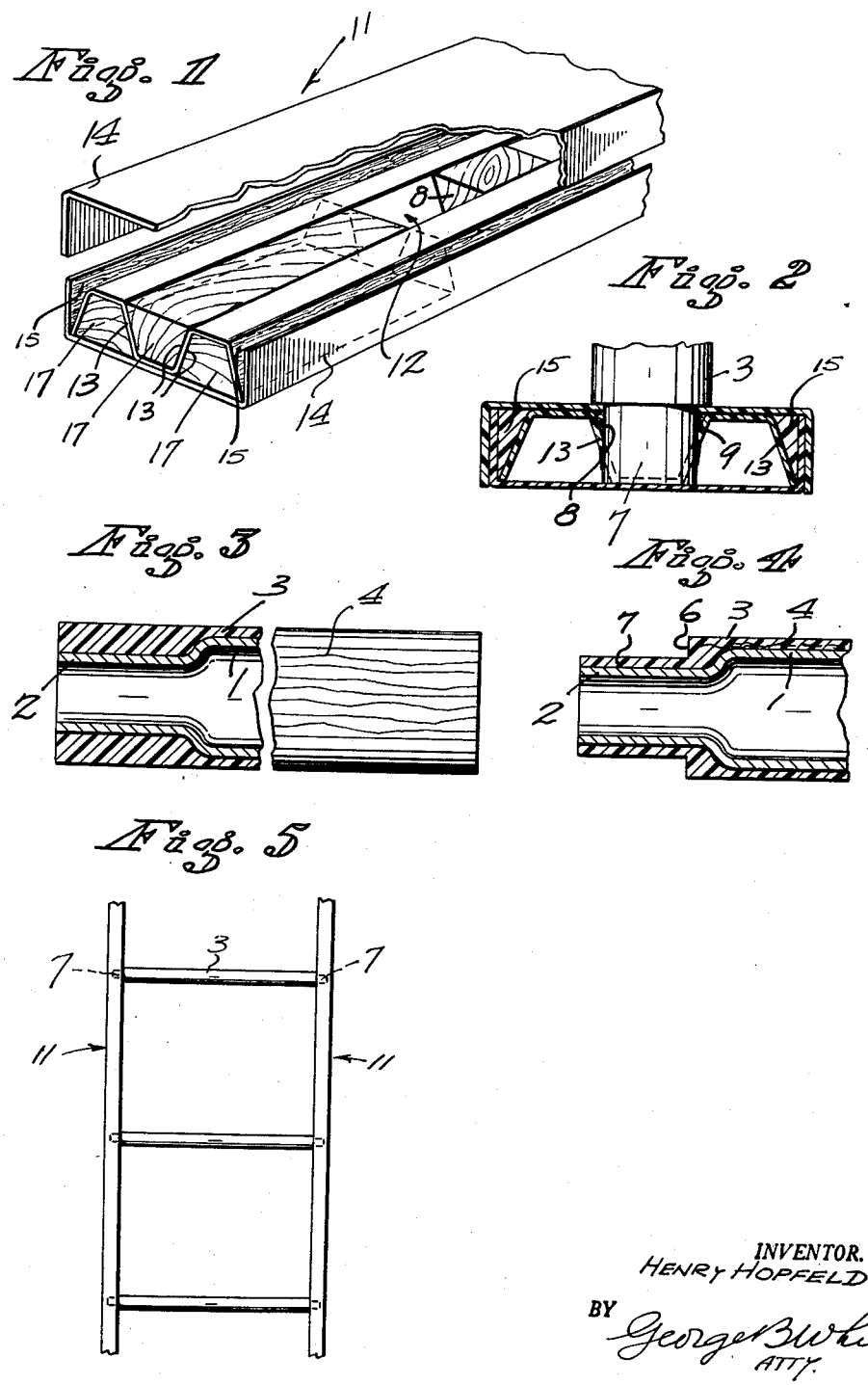
INVENTOR.
HENRY HOPFELD
BY George B White
ATTY.

United States Patent Office 2,932,358
Patented Apr. 12, 1960

2,932,358

LADDER CONSTRUCTION AND THE METHOD FOR MAKING THE SAME

Henry Hopfeld, San Rafael, Calif.

Application December 4, 1956, Serial No. 626,176

3 Claims. (Cl. 182—46)

This invention relates to a ladder construction and the method for making the same.

The primary object of this invention is to provide a ladder preferably made out of fiberglass or similar plastic material suitably reinforced so as to result in a ladder which is very firm and rigid, and which has high dielectric component and which is very light.

Particularly it is an advantage of my invention that a ladder is provided which is suitable reinforced by very light materials so that both the rails and the rungs of the ladder are of hollow material yet are rigidly united.

Another object of the invention is to provide structural elements which may be used as side rails for ladders or utilized for other purposes as a structural element in which the joining portions with another element are suitably reinforced by a light material in such a manner as to produce tight integral joints.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a perspective view of the structural elements which in this illustration are used as one of side rails in a ladder.

Fig. 2 is a cross-sectional fragmental view of the side rail showing the integral joining thereinto of another structural element such as the rung of a ladder.

Fig. 3 is a fragmental partly sectional view of a rung of a ladder at one step of its manufacture.

Fig. 4 is a fragmental view of one end of a rung of a ladder or structural element of the completion, and Fig. 5 is a general illustration of a fragment of a ladder into which the said elements are assembled.

As shown in Fig. 1, and Figs. 3 and 4, the tubular rung is made by a novel sequence of steps for making unitary structures. The first step is that the light metal tube, such as magnesium tube 1 of rung length is reduced in diameter at each end as shown at the reduced ends 2 in Fig. 3. Then the entire tube is covered with fiberglass long fiber plastic 3, the fibers 4 of which are arranged longitudinally and unidirectionally with respect to the tube from end to end. Then a fiberglass mat is wrapped around the tubing and the unidirectional fiberglass for reinforcing it. Then the fiberglass covering is substantially saturated with polyether or other suitable plastic material. Then this entire tube is suitably cured or set, for instance under pressure and heat. In other words, the fiberglass and polyether are thermo-set into the form shown in Fig. 3. The set plastic is turned down at each end to about the same thickness of plastic on the tube as the thickness of the plastic in the middle portion of the tube and so as to leave a preferably square shoulder 6.

As an alternative method, the tube may be covered with fiberglass long fiber plastic and a layer of fiberglass matting, as heretofore described, but instead of being cylindrical from end to end, as shown in Fig. 3, the fiberglass plastic is so laid that its thickness is substantially the same relatively to the wall of the reduced end tube as relatively to the other parts of the covering. Then the tube so covered is placed in a mold which mold is so shaped that it forms the shoulder 6 sharply, as shown.

Then the reduced end 7 of the rung is bonded integrally into a socket 9 in a block 8 in the side rail so that the plastic materials on the reduced end of the rung and in the plastic side rails are integrally united.

As part of the process, the side rails are formed by having a suitable webbing bonded and integrally secured inside of the hollow railing with socket blocks 8 at points surrounding the sockets into which the ends of the rungs are secured.

Structurally, each side rail is made of a hollow column with a webbing in it. The hollow column 11 is also made of suitable plastic, such as fiberglass plastic material, and the webbing 12 is preferably of the same fiberglass plastic material having unidirectional fibers and reinforcing mat formed longitudinally in the hollow body and integrally bonded to the same. The webbing in this form is shaped by alternate channels 13, alternately facing toward the opposite sides of the hollow rail 11. As shown in Fig. 1, the hollow side rail 11 is formed by a pair of channels 14 nested together so that the longitudinal narrow flanges overlap and can be bonded together. Inside of one of the channels 14 is placed the corrugated or zig-zag webbing 12 and is bonded to both of the side rail sections 14 by suitable bonding, being that all these elements are made preferably of the same kind of plastic, namely so-called fiberglass plastic. Before such bonding a block 8 is inserted at the points where the rungs are connected.

The socket is so formed that it extends not only through the block but also through the adjacent inclined side walls of the webbing which is preferably of the same material as the fiberglass plastic on the reduced end 7, thus as bonding occurs the reduced end 7 is bonded both to the block and to the webbing at said points and thus forms wholly integral part of the side rail which prevents turning or twisting of the rung. This is further reinforced against vibration or bending by the engagement of the shoulder 6 with the adjacent face of the side rail. The reduced end 7 is somewhat of lesser length than the depth of the side rail so that it does not extend entirely through the side rail.

In addition at each end of the ladder suitable reinforcing blocks, such as wood or fiberglass blocks 17, are bonded as heretofore described, so as to be engageable by shoes or leaners in the end of the ladder without chipping the said end. These end blocks 17 extend beyond the location of the socket 9 nearest to the respective end of the ladder to provide bearing strength at each end. The longitudinal space between each flange of the channel 14 and the adjacent wall of the webbing 12 is also filled with longitudinally unidirectional fiberglass plastic filler 15 for added strength of the side rail of the ladder.

The result is light and structurally firm element and a ladder which is entirely of fiberglass plastic electrically non-conductive material and integral at all the joints and protected against splitting, chipping, bending or breaking.

This ladder is of superior utility and it can be quickly and efficiently manufactured by the method herein described.

The result further will be that the rungs will be much stronger because the unidirectional fiberglass arrangement combined with the matting from end to end on each tube or rung extends straight into the socket and into the respective side rails of the ladder which gives additional strength to the rungs. The shoulders definitely locate the rungs of the ladder at uniform and proper spacing and bonding the same with press-fit of the reduced end of the tubing in the socket which will prevent the ladder from swaying and will prevent the turning of the rung. This is further prevented by the anchoring of the ends of the rungs in the sockets and into the webbing material surrounding the same.

I claim:

1. In a ladder of the character described, a pair of side rails, each rail including a pair of channel members integrally united together along their longitudinal sides so as to form unitary hollow side rail, reinforcing webbing arranged longitudinally in each hollow side rail and integrally bonded with the same, reinforcing socket blocks in said webbing integrally bonded with the same and having sockets therein accessible through the face of one of said channel members so as to permit bonding into and through said webbing, said channel members and webbing being of fiberglass plastic bonded together, and a rung having unidirectional and matted fiberglass plastic from end to end thereon, and having its ends integrally bonded in said respective sockets with said blocks and webbing.

2. In a ladder of the character described, a pair of side rails, each rail including a pair of channel members integrally united together along their longitudinal sides so as to form unitary hollow side rail, reinforcing webbing arranged longitudinally in each hollow side rail and integrally bonded with the same, reinforcing socket blocks in said webbing integrally bonded with the same and having sockets therein accessible through the face of one of said channel members, said channel members and webbing being of molded fiberglass plastic bonded together, and a rung having unidirectional and matted fiberglass plastic from end to end thereon, reduced ends at the ends of said rung integrally bonded in said sockets with said blocks and webbing, and a shoulder at each reduced end of the rung bonded with the adjacent face of the side rail at said socket.

3. In a ladder of the character described, a pair of side rails, each rail including a pair of channel members integrally united together along their longitudinal sides so as to form unitary hollow side rail, reinforcing webbing arranged longitudinally in each hollow side rail and integrally bonded with the same, reinforcing socket blocks in said webbing integrally bonded with the same and having sockets therein accessible through the face of one of said channel members, said channel members and webbing being of fiberglass plastic bonded together, and a rung formed of a light rigid core, and reinforced plastic layers surrounding said tube, each end of rung being reduced to fit into said socket, a shoulder at each reduced end engaging the face of said side rail adjacent said socket, said reduced ends and shoulders being integrally bonded to said webbing and side rail face respectively at said sockets.

References Cited in the file of this patent

UNITED STATES PATENTS

| | | |
|---|---|---|
| 1,653,248 | Allen et al. | Dec. 20, 1927 |
| 2,727,672 | Suca | Dec. 20, 1955 |
| 2,738,120 | Furhriman | Mar. 13, 1956 |
| 2,776,080 | Hopfeld | Jan. 1, 1957 |
| 2,788,167 | Morrison | Apr. 9, 1957 |
| 2,855,134 | Arnold | Oct. 7, 1958 |
| 2,862,650 | Scott | Dec. 2, 1958 |